United States Patent
Remane

[11] 3,913,609
[45] Oct. 21, 1975

[54] HEAD FOR CONNECTION TO REPLACEABLE GAS CARTRIDGE

[75] Inventor: Roger Remane, Sainte-Colombe, France

[73] Assignee: Application Des'Gaz, Paris, France

[22] Filed: Nov. 12, 1973

[21] Appl. No.: 415,134

[30] Foreign Application Priority Data
Nov. 10, 1972  France .................................. 72.40621

[52] U.S. Cl. ............................. 137/322; 222/402.14
[51] Int. Cl.² ............................................. B65D 83/14
[58] Field of Search ................... 137/317, 322, 223; 222/402.1, 402.11, 402.14, 402.24, 402.25; 129/9 R, 29, 38

[56] References Cited
UNITED STATES PATENTS

| | | | |
|---|---|---|---|
| 1,490,628 | 4/1924 | Myers | 137/233 |
| 3,273,610 | 9/1966 | Frost | 222/402.14 X |
| 3,557,833 | 1/1971 | Gilmont | 251/205 X |
| 3,589,562 | 6/1971 | Buck | 222/402.14 X |
| 3,613,960 | 10/1971 | Beard | 222/402.1 X |
| 3,645,496 | 2/1972 | Rawlins | 137/322 X |

Primary Examiner—William R. Cline
Attorney, Agent, or Firm—Dowell & Dowell

[57] ABSTRACT

An improved connection head for use in a portable lighting or cooking or heating device burning gas from a replaceable cartridge which has in one of its walls a check valve inwardly displaceable to release stored gas to the connection head, the head comprising a casing having a bore disposed opposite said cartridge check valve, a sleeve reciprocable in the casing bore, a rod extending through the casing and the sleeve coaxially therewith, spring means urging the rod toward the cartridge to displace its check valve, the sleeve having annular packing disposed to seal against the wall of the cartridge around the check valve, and these parts being provided with inter-engaging abutments such that the spring means urges the rod toward the check valve and the rod urges the sleeve to seal against the wall of the cartridge around the check valve, the force of the spring being sufficient to displace the check valve but insufficient to puncture the wall of a cartridge, and the rod having a conical surface operative with said annular packing to control the rate of flow of gas from the cartridge.

7 Claims, 15 Drawing Figures

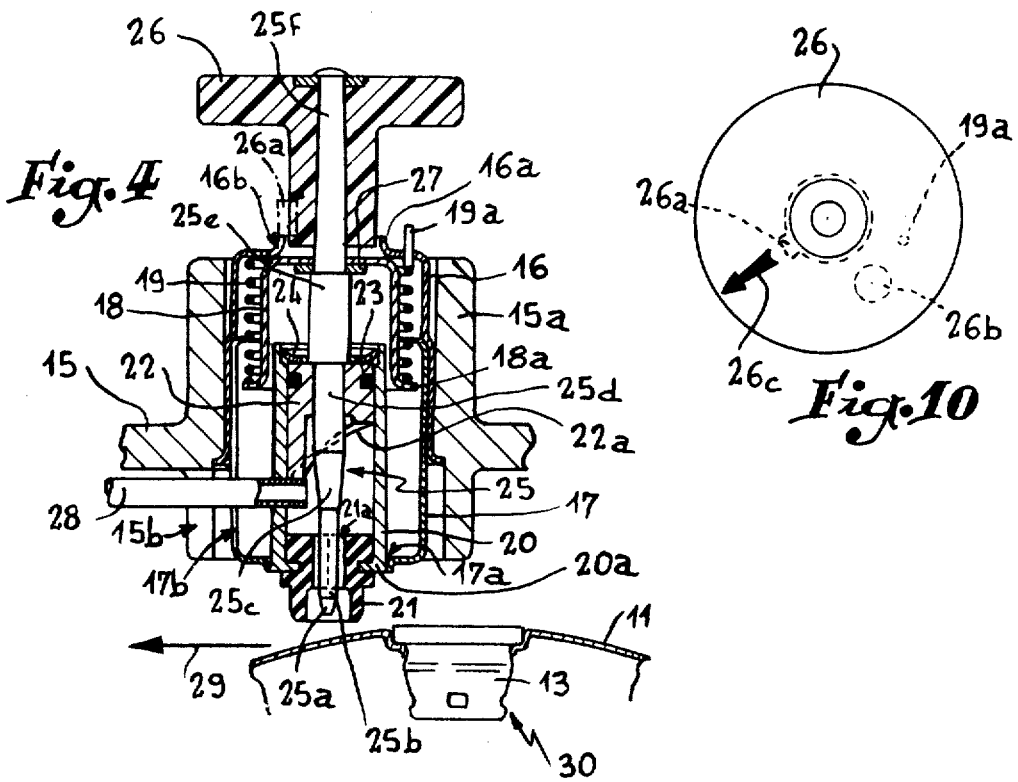
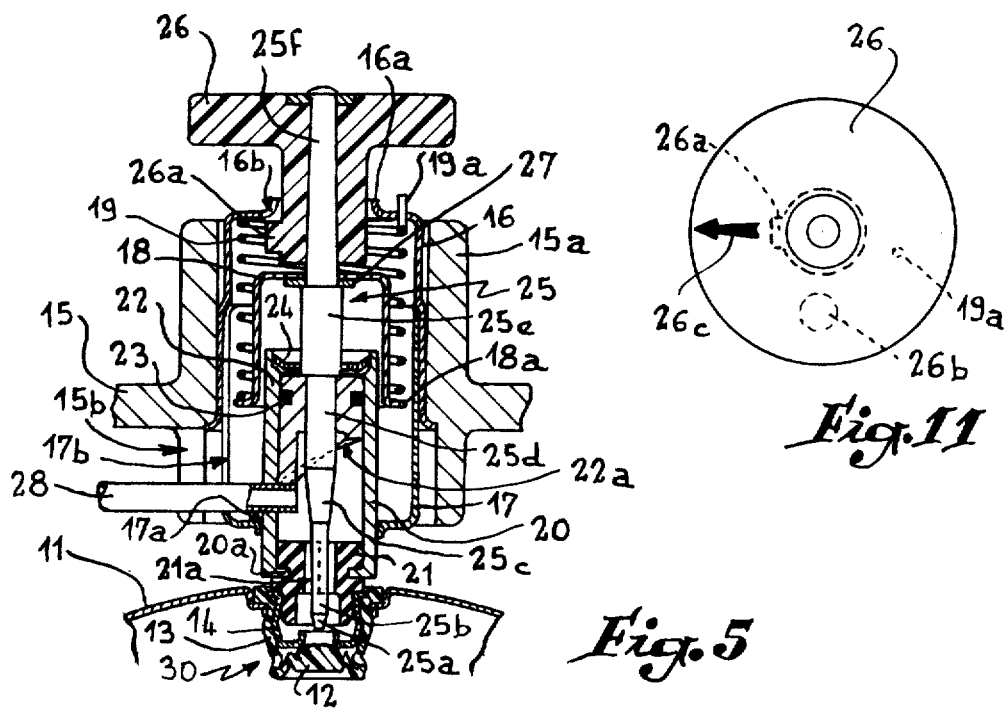

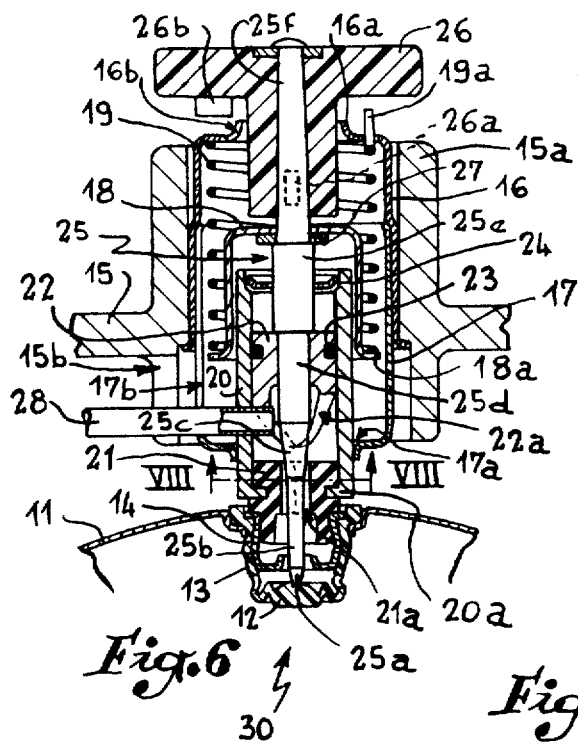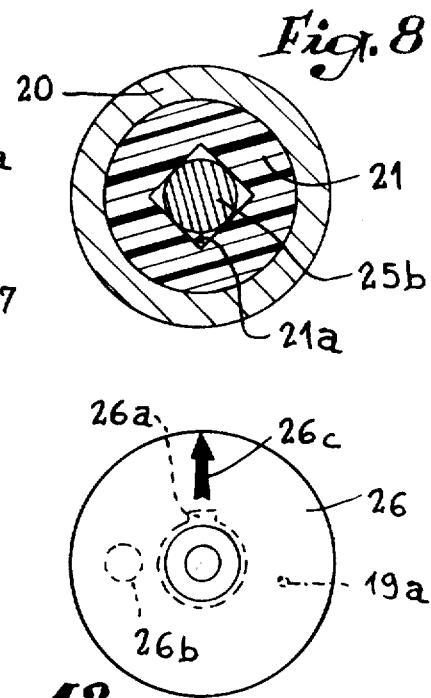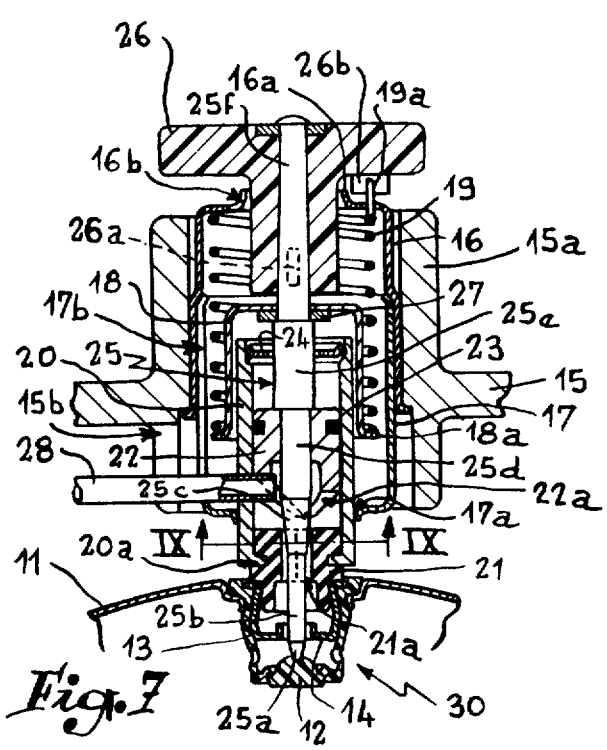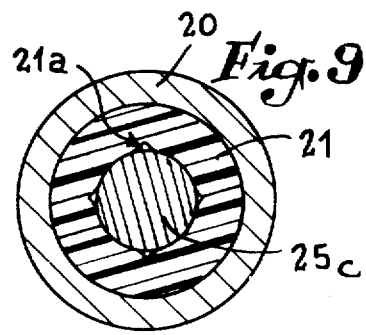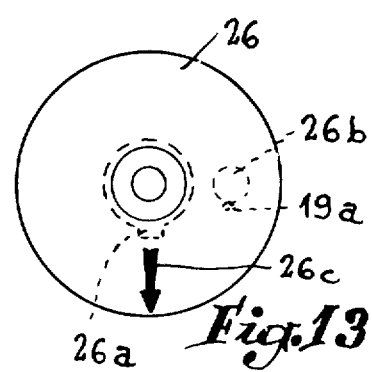

HEAD FOR CONNECTION TO REPLACEABLE GAS CARTRIDGE

DESCRIPTION OF THE INVENTION

The invention relates to connection heads for use in devices for burning a compressed gas confined in a combined but removable cartridge which includes a valve opening after mounting of the cartridge and its sealed connection. More particularly the invention relates to devices operating by the combustion of a compressed gas such as butane, propane, etc., contained in liquid form in the cartridge.

The most interesting applications include portable lighting, cooking, heating, and the like apparatus, especially for camp use.

Known devices of this type comprise, in combination with a check valve for a removable recharge cartridge, a connection head provided with an annular thread and an opening actuator finger capable, when the cartridge is connected to the device by sealed tightening of the annular thread around the valve outlet orifice of the cartridge, of projecting through the said orifice to press the check valve member away from its seat and keep it open. In such units, to be serviceable, the valve must prevent leaks in severe conditions of use at possibly high pressures, especially in summer on exposure to the sun.

The cost of the valve is high since it must provide for a perfectly sealed permanent closure before the mounting of the cartridge in the use device, and also after removal of a still partially filled cartridge. Therefore, the manufacturers have elected to mount such a valve on removable and rechargeable tanks of high strength and heavy weight, instead of on light, disposable container type cartridges.

To avoid the necessity of transporting heavy empty tanks it has been suggested also to provide valveless cartridges in the form of light sheet metal containers which, when mounted in the device, are pressed against an annular joint packing and perforated inside the circle formed by the packing with a steel rod in the form of a spur included with the packing in the sealing joint. However, such a unit is not as safe as desired, and may even be dangerous if an incompletely exhausted cartridge from which a considerable quantity of highly flammable gas can escape incontrollably through the perforation in the wall is removed inadvertently.

In U.S. patent application Ser. No. 215,306, filed Apr. 1, 1972, now U.S. Pat. No. 3,776,427, the applicant disclosed a cartridge in the form of a disposable light container provided with a perfectly sealed two-part valve of very economical manufacture.

For example, such a cartridge may be shaped cylindrically as a food can, and provides for the user a high degree of safety if he utilizes the said cartridge in a device whose connection joint is especially arranged not to damage the valve.

To protect the user from all risks the joint must not permit perforation of the cartridge wall, regardless for example of whether the cartridge was initially introduced in reverse or was of different manufacture and in this case not provided with a valve or equipped with a different valve.

Aside from these safety conditions which are indispensable to the user, it is also important to the responsible manufacturer whose obvious economic interest is to prevent users from utilizing recharge cartridges of other origin on its own cartridge devices.

When a manufacturer markets a complete unit, i.e. the device and its recharge cartridge, he is subject to considerable economic loss if one or the other of the two articles of his production is subsequently replaced by a competitive article instead of by the article contained in his own line of production.

In other words the original device should be capable of operational connection only to a cartridge of the same source, equipped with the original check valve, and only if the said valve is correctly positioned relative to the especially arranged joint of the device.

For this purpose, according to the invention, the valve member actuator finger is spring loaded so that it is axially slidable in the gas connection head in which it is mounted. The finger is loaded by an elastic force, particularly that of a spring, to project outward, and the value of the said force opposing the retraction of the finger into the gas connection head is sufficiently high to overcome the force opposing the opening of the valve, but insufficient to perforate the wall of the cartridge or of any other cartridge contacting the end contact area of the said finger.

The invention is therefore based on the fact that, for simple safety reasons, the wall of a cartridge containing a compressed gas must always be capable of resisting a perforating external pressure much higher than the opening pressure necessary to open the check valve, even if the said wall is made of very thin sheet metal.

In the earlier applicant's patent cited above the valve outlet orifice is located at the bottom of a cylindrical recess in the cartridge external surface.

The connection head of the device has been improved in the interest of cooperation with such a valve.

For this purpose:

the annular seal to the container wall consists of an elastically inflatable elastomer packing inserted coaxially with mild friction into the said recess to provide for a primary seal by initial radial friction increased subsequently after the opening of the valve by self-tightening in response to the radial pressure applied by the gas flowing through the elastomer packing and inflating it so that it presses against the peripheral wall of the said recess;

the said elastomer packing is carried by a sleeve in sealed conditions in the gas connection head, and without seal against the finger extending coaxially through it;

an abutment of the finger, which is retractable into the sleeve, cooperates with the said sleeve and drives it along to the mutual position of maximum outward extension in response to the elastic force, particularly that of a spring, loading the finger in that direction;

an additional complementary arrangement is used advantageously to predetermine precisely the position of full opening of the valve without risk of urging it beyond the said position.

This arrangement consists in:

providing the sleeve or the elastomer packing carried thereby with a rigid shoulder coming into contact with the edge of the recess to limit the depth of penetration of the sleeve into the recess;

in the assumption that the actuator finger is in contact with the sleeve, i.e. in maximum extension relative thereto, the said shoulder is in contact with the cartridge, determining the distance by which the actuator finger projects beyond the sleeve so that its free end comes into contact with the valve member in the position of maximum opening;

and determining the elastic foece, especially force, of the spring, pressing the actuator finger outward with a force sufficient to maintain the finger in contact with the piston against the force acting to close the valve.

It will be understood that the last two complementary arrangements are intended to deter the user from mounting in the device a cartridge of another type comprising a valve different from that of the original cartridge. Thus, if such a cartridge of another type is mounted in the device the sealing elastomer packing whose axial rigidity is too low and which is retractable in the valve actuating stem with the sleeve carrying it, is not capable of providing for the seal by simple axial pressure against the cartridge wall along the periphery of the valve.

In another feature of the invention the valve actuator finger consisting of a rod or pin is in the form of a tapered needle to cooperate with an internal seat, so that if penetration thereof continues after it has opened the valve for the predetermined maximum flow, the said needle provides for a progressively decreasing flow, and the necessity to use the independent control valve frequently associated with gas connection heads is eliminated. The said seat is advantageously constituted by a portion of the elastomer, and in a preferred embodiment in the form described in U.S. patent application Ser. No. 376,517, filed July 5, 1973, now U.S. Pat. 3,825,224 issued in the name of the applicant, comprises for example a square axial orifice capable of cooperating with the tapered portion of the finger.

To permit the displacement of the finger relative to the annular elastomer packing constituting the seat, an axially shaped cylindrical surface system is arranged preferably between the finger and the packing support element, and constitutes a support point between the said finger and elastomer packing support element. Therefore, the rotation of the finger allows the spring acting thereon to press it deeper into the cartridge to provide for the opening of the internal valve, and then for progressive flow regulation.

The attached drawing relates to an example clarifying the invention, its features, and the advantages provided thereby.

FIG. 4 is a longitudinal section illustrating in the inoperative position another embodiment of a head according to the invention, in which the valve actuator finger constitutes also a gas flow control or regulation needle.

FIGS. 5, 6 and 7 illustrate the same embodiment in three positions of the elements, i.e. positioning on a cartridge, after partial lowering of the needle, and after complete lowering (low flow position).

FIGS. 8 and 9 are sections along VIII—VIII (FIG. 6) and IX—IX (FIG. 7).

FIGS. 10–13 are plan views of the actuator finger control knob, corresponding to the above four FIGS. 4–7.

Figure 15:
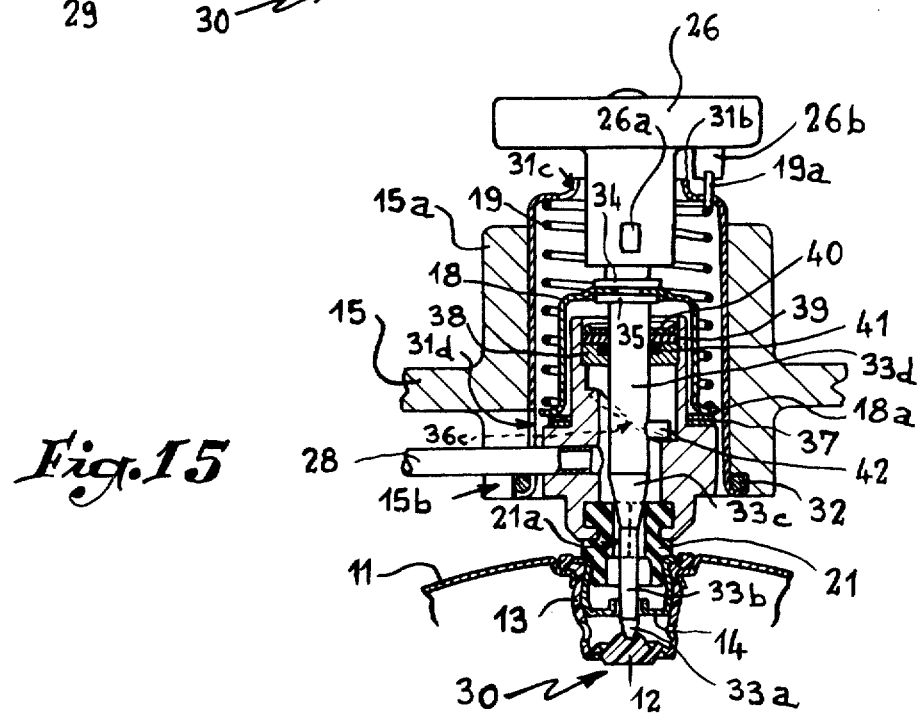

FIG. 15 corresponds to the low flow position in which the finger or needle is fully depressed.

Figure 1:
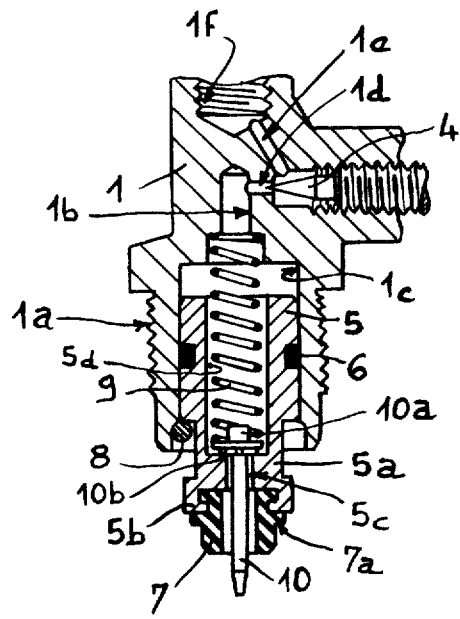
FIG. 1 is a longitudinal section of a gas connection head constructed according to the invention, in the inoperative position.
Figure 2:
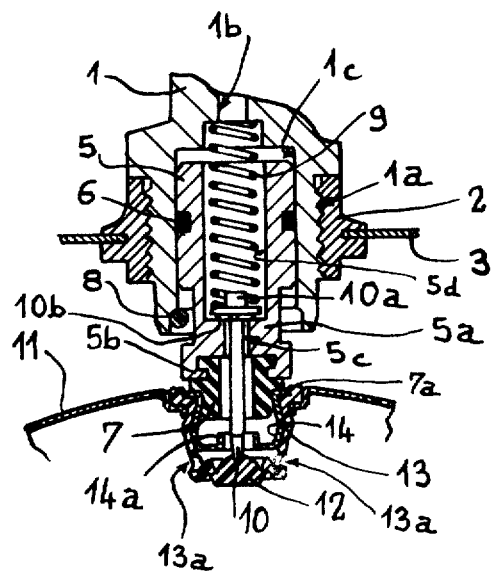
FIG. 2 shows the said head applied to a cartridge arranged to receive it.

The gas connection head represented in FIGS. 1 and 2 comprises a body 1 whose cylindrical bottom is provided with an outer thread 1a screwing in a known manner into the corresponding recess of a sleeve 2 attached to a fixed support 3 such as a cartridge carrying cup. Body 1 is a cylindrical casing provided with an internal passage 1b opening at the bottom of a recessed bore 1c in the cylindrical bottom. In the example represented the head contains a valve whose needle 4 cooperates with a radial passage 1d connected to axial passage 1b and to an inclined passage 1e opening into a top threaded boring 1f designed, for example, to receive a burner.

A sleeve or piston 5 provided with a toric packing 6 slides in bore 1c. The sleeve is extended downward by a shank 5a whose end is in the form of a socket 5b with inwardly folded edge, in which a flexible and elastically expandable elastomer packing 7 is set and projects considerably downward. A laterally located transverse pin 8 prevents the escape of the sleeve 5 from its bore.

Sleeve 5 is provided with a recessed axial bore 5d containing a spring 9 in contact with the bottom of a recess located at the top of bore 1c, and acts on the cylindrical head 10a of a finger 10 extending without seal through an axial bore 5c in shank 5a, socket 5b, and packing 7, and by a considerable distance beyond the bottom of the said packing. The said finger can be made of any metal (for example soft steel), and ends in a flattened or, in a modification, a slightly rounded point.

The periphery of packing 7 is provided with a shoulder 7a in contact with the end face of sleeve 5 to form a penetration stop to be further mentioned below. In a modification, instead of being constituted by a portion of packing 7 the said stop is formed by a peripheral portion of the end face of sleeve 5 abutting against packing 7 at its origin on the said face.

The gas connection head of the invention, as described above, is designed to prevent operational connection with a cartridge 11 unless it is equipped with the valve constituting the object of earlier mentioned patent Ser. No. 3,776,427 in the name of the applicant.

It should be observed here that the said two-piece valve comprises a member 12 pulled continuously by an elastically extendable socket 13 for sealed contact around an orifice 14a provided through the center of a rigid cup 14 fitted into the top of cartridge 11 and constituting a substantially cylindrical recess therein. Skirt 13 is perforated at 13a for the passage of the gas.

This being established, the operation is as follows.

Cartridge 11 is first positioned in support 3. Head 1 is then screwed into sleeve 2.

The projecting portion of packing 7 then penetrates with mild friction into the substantially cylindrical recess in cup 14 until the shoulder 7a of packing 7 comes into contact with the edge of the recess formed by cup 14 in cartridge 11. In the position of introduction of the packing into cup 14, limited in this manner by a stop, the packing provides for a primary seal caused by slight radial pressure toward the periphery.

Spring 9 is sufficiently strong so that, during the introduction of packing 7 into cup 14, it can be pressed back into the joint only to the extent that sleeve 5 moves along with it. The projecting distance of finger 10 beyond sleeve 5 is determined so that, at the end of the introduction of packing 7 into cup 14, its free end presses valve member 12 away from its seat and retains it in the maximum opening position represented in FIG. 2. The gas contained in cartridge 11 can then escape through holes 13a and orifice 14a, flow axially through packing 7 and sleeve 5 around finger 10, and pass under head 10a between radial ribs 10b by which the said head is in contact with sleeve 5 to penetrate boring 1c. From boring 1c the gas continues to escape through passages 1b, 1d, and 1e, and through threaded boring 1f with a flow adjusted or blocked by needle 4.

It will be observed that the gas passing through packing 7 inflates the said packing and presses its periphery radially against the substantially cylindrical wall of the recess formed by cup 14, improving the primary seal with an operational seal whose effectiveness increases automatically with the pressure of the gas to which it must resist. As soon as the gas pressure drops or disappears packing 7 is no longer urged radially and returns to its inoperative form.

It will be noted also that the thrust applied by finger 10 to valve member 12 is strictly limited by the calibration of spring 9, which also limits the force opposed by packing 7 to cartridge 11 on engagement thereof into cup 14. This calibrated force is as weak as possible, so that it is too weak to move valve members of a different type with too strong closing springs away from their seat, and too weak to provide for the seal of the connection if relatively flexible packing 7 were to attempt to provide a seal by end face contact without peripheral support against cartridge 11 around a different type of valve, instead of operating by engagement into the recess of a cup 14 of corresponding diameter.

It should be noted here also that although the head of FIGS. 1 and 2 is not applicable to cartridges with perforable closure, the said head is not damaged by a misguided attempt to mount it on such a cartridge. The only result is that finger 10 moves back into sleeve 5 and compresses spring 9 a little more than in normal use.

Figure 3:
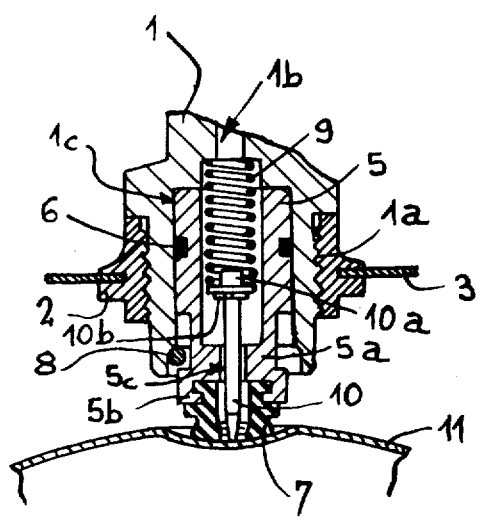
FIG. 3 is a section illustrating the conditions on application of such a head to a cartridge with perforation closure.

The embodiment of FIGS. 4-7 relates to a head designed to remain fixed to a support 15 under which a cartridge 11 is to be mounted. The said support is attached to a socket 15a projecting above and under it. A cylindrical metal casing consisting of two elements 16 and 17 suitably assembled by force fit and crimping is fitted into the said socket. A thin metal cup 18 whose edge 18a is bent horizontally slides in the said casing and is urged by a compression spring 19 abutted against the top wall of casing 16, 17. A cylindrical sleeve 20 slides in cup 18, extends through a central opening in casing 16, 17, and is provided with a lower edge 20a bent inward to retain a packing 21 projecting downward and having the same function as packing 7 in FIGS. 1-3. The said packing contains a third sliding element 22 in the form of a tubular piston provided with a toric packing 23. The lower edge 22a of the said piston is in the form of a cylindrical cam of helical shape as described below. A concave ring 24 forced into the top of sleeve 20 limits the upward stroke of piston 22.

An axial rod 25 is force fitted in sealed conditions into piston 22, and comprises from the bottom: A conical portion 25a with a flattened or rounded point, a small diameter cylindrical finger portion 25b, a tapered portion 25c, a second cylindrical portion 25d, a third cylindrical portion 25e of large diameter, and finally a top portion 25f tapered at a very small angle and carrying an actuator knob 26. As indicated large diameter cylindrical portion 25e is limited by two shoulders. The lower shoulder abuts against piston 22, and the bottom shoulder is in contact with a ring 27 supporting the bottom of cup 18 suitably perforated for the passage of the base of tapered portion 25f.

The base of knob 26 engages a circular opening provided in the bottom of the upper element 16 of casing 16, 17. The bottom of the said opening is bent upward as indicated at 16a. The base of knob 26 carries a radial extension 26a (FIG. 5) which, when the head is in the inoperative position (i.e. when the device does not contain a cartridge), rests on raised edge 16a (position of FIG. 4) which is provided at one point of its periphery with a slot 16b for the passage of the extension when the knob is oriented in the appropriate direction.

It will be observed also that the lower face of the knob head carries a tooth 26b (FIGS. 6 and 7) which, when the knob is depressed, comes into contact with a pin 19a projecting upward from the top of the element of casing 16, 17, and consisting in the illustrated example of the raised end of spring 19 passing through an opening in the said casing top.

The wall of sleeve 20 is engaged in sealed condition by the end of a horizontal tube 28 passing through a vertical slot 15b in the bottom of socket 15a, through another slot 17b in the lower element 17 of the casing, and ending into the gas load line (for example the feed line for one or more burners). Tube 28 is vertically movable in the said slot, either because of its sufficiently flexible structure, or because it is connected to the said line by a flexible hose. The said end of tube 28 extends into the interior of sleeve 20 to cooperate with the lower edge or cylindrical cam 22a of piston 22 in response to spring 19 biasing cup 18, needle 25, and the said piston 22 downward.

The axial orifice in axial packing 21 is arranged to cooperate with the lower portion of rod 25 (cylindrical portion 25b and tapered portion 25c) as described in the above cited U.S. Pat. No. 3,825,224. In other words the said axial orifice is square as indicated at 21a in FIG. 8, and the length of the side of the square is substantially equal to the diameter of the cylindrical portion 25b of the needle acting here as a valve member.

The operation is as follows.

In the inoperative position (FIG. 4) the extension 26a of knob 26 rests on the raised edge 16a of the upper opening of casing 16, 17, and needle 25 and cup 18 are retained against the force of spring 18 biasing them downward. The lowest point of cam 22a is in contact with tube 28 so that the point 25a of the needle is located inside annular packing 21. Knob 26 has been rotated to one of the extreme positions of its angular motion. Assuming that the upper face of the said knob is provided with an arrow 26b (FIG. 10) located in the radial plane of extension 26a the said face is in the indicated position.

Since the head unit is in the upper position cartridge 11 can be introduced into the device as indicated by arrow 29 until a valve identical to that shown in FIG.

2 and designated here by the general reference 30 is centered under the head.

Then knob 26 is rotated so that extension 26a is in line with slot 16a (position of FIG. 11). Spring 19 lowers cup 18 and needle rod 25 together with piston 22 whose edge or cam 22a lowers tube 28 and sleeve 20 so that annular packing 21 sinks into the metal cup 14 of valve 30, as indicated in FIG. 5.

Needle rod 25 and piston 22 with its cam 22a are naturally rotated with knob 26. But the cam is shaped so that the point 25a of the needle is not lowered substantially into annular packing 21.

As the operation of knob 26 is continued to move arrow 26c to the position of FIG. 11 cam 22a, acting on tube 28 which cannot move further downward after complete introduction of packing 21, allows spring 19 to lower needle rod 25 whose point 25a acts on the member 12 of valve 30 to disengage it from orifice or seat 14 (position of FIG. 6). Since the tapered portion 25 of the needle rod has not yet penetrated the passage 21a in annular packing 21 the gas passage is cleared to the maximum as shown in FIG. 8. This is the position of full opening.

If the rotation of knob 26 is continued needle rod 25 continues its downward motion and its tapered portion 25c acts as a valve needle to deform and close passage 21a progressively as disclosed in the above cited U.S. Pat. No. 3,825,224. This operation ends at the position of extremely reduced flow indicated in FIGS. 7, 9, and 13.

The rotation of knob 26 is limited at the above indicated position by tooth 26b as it abuts against pin 19a. In the opposite direction a projecting portion of cam 22a abuts against the end of tube 28.

The form of the head as in FIGS. 4-7 combines the advantages of that of FIGS. 1 and 2 with that of the needle valve described in the above cited U.S. Pat. 3,825,224.

Figure 14:
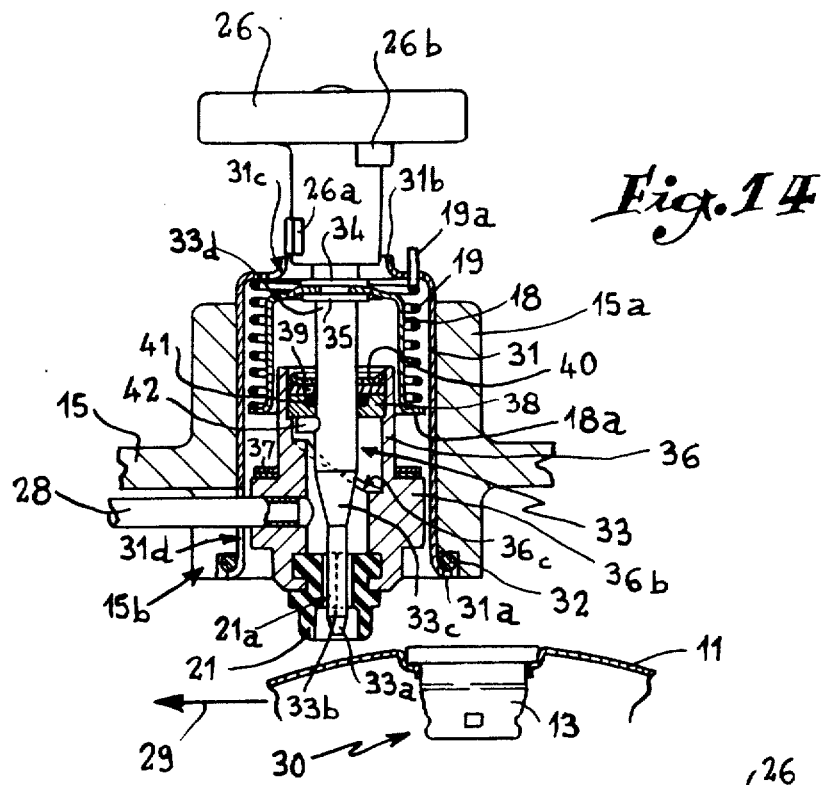
FIG. 14 is a longitudinal section of a modified head provided with a control needle, the elements being represented in the inoperative position.

The embodiment of FIGS. 14 and 15 is a modification of the above described structure, and only the differences will be described.

The casing containing spring 19, designated here by numeral 31, is a one-piece cylinder provided with a lower edge 31a flared against a retaining ring 32. Again, a raised upper edge 31b is provided with a slot 31c, and a lower slot 31d is provided for the passage of tube 28.

The needle rod, designated here by reference numeral 33, comprises no large diameter portion forming a contact shoulder for the bottom of cup 18. The edge of the central opening in the said cup is retained simply by two split rings 34 and 35 mounted in a groove of needle portion 33d.

The sleeve, designated here by reference numeral 36, does not slide in the central opening of the bottom portion of the casing, but is provided with a bottom flange 36b sliding directly on the cylindrical wall of casing 31, and against which the raised edge 18a of cup 18 can abut over adjustment blocks 37 as described below.

The piston 22 of FIGS. 4-7 is replaced here by a plug 38 force fitted into the top portion of sleeve 36, in contact with a bottom shoulder thereof, and held in place by a flat annular packing 39 pressed against it by a tapered elastic ring 40 force fitted into the sleeve. The cylindrical portion 33d of needle rod 33 slides through the said plug which is provided with a groove containing a toric joint 41.

The cylindrical portion 33d of the needle carries a radial pin 42 cooperating with an inclined cylindrical surface 36a provided inside sleeve 36.

The operation of this modified structure is the same as described above in reference to FIGS. 4-7, except that, on operation of knob 26, the displacements of the needle rod are caused not by a cylindrical cam integral with a piston itself integral with the said needle and acting on a support point rigidly fixed to the sleeve, but by an inclined cylindrical surface integral with a sleeve and acted upon by a support element integral with the needle. It will be readily understood that the two structures are designed to provide the same results.

Another notable particular feature is that, at the end of the motion, i.e. when the tooth 26a of knob 26 abuts against pin 19a the bottom edge 18a of cup 18 rests on blocks 37 limiting its downward motion, i.e. the pentration of the tapered portion 33c of the needle into the square passage 21a in annular packing 21. The said blocks therefore permit an individual adjustment of the reduced flow in the head, which may be very useful when the device is applied to a stove.

It is understood also that the above description is supplied only as an example without restricting the scope of the invention, and the said scope would not be exceeded by substitution of equivalents for the described details of structure. It is understood in particular that many means can be devised to move the axial needle selectively downward so that the said needle can act as a valve member controlling the gas flow after lifting the internal cartridge valve member.

I claim:

1. An improved connection head for use on a device consuming pressurized gas from a removable cartridge having in a wall of the cartridge facing the head an inwardly displaceable check valve, said connection head comprising a casing opposite said cartridge, a sleeve reciprocable in said casing, a rod extending through the casing and having a finger disposed to displace said check valve, an annular packing fixed to the sleeve and the sleeve and packing coaxially surrounding the finger, spring means in the head and operative to urge the sleeve outwardly toward the wall of the cartridge to seal the packing thereagainst and to urge the rod outwardly toward the cartridge so that the finger displaces the check valve of the cartridge, said improvement comprising the connection head wherein said spring means is operative between the casing and the rod for urging the finger outwardly of the head, the yield limit of said spring means being further chosen so that the yieldable force of the spring means on said finger will be sufficient to displace and hold open said valve but will be insufficient to puncture the wall of the cartridge, said improvement comprising further, mutually abutting stops for imparting force from said rod to said sleeve in such an unidirectional manner as to shift said sleeve outwardly of the casing when the rod is urged outwardly by the spring means, the sleeve being released by the stops to retract inwardly into the casing at least for a part of its return travel when the rod is displaced inwardly of the casing.

2. The connection head as in claim 1, further comprising means for fully retracting the rod into the casing, coacting return stops carried by the rod and the sleeve and operative, when retracted, to retract for at least the most retracted part of the rods return travel said sleeve, said rod extending through the end of the casing opposite said cartridge and carrying on its end opposite said finger a knob, the pulling of which will retract against the force of the spring means said sleeve to release an empty cartridge from the connection head, so as to be exchanged for another filled one.

3. The connection head as in claim 2, further comprising, in said casing a circular opening through which a portion of said rod and the knob pass, said portion having a radial extension and said opening in the casing having a radial slot of shape corresponding with the extension, so that said radial extension when brought in alignment with said slot by turning the knob can be retracted to pull the finger into the casing of the head and, after a subsequent partial turn of said knob, remain retracted in this position with said radial extension out of alignment with the slot, thereby retaining the finger and the sleeve in retracted position in the head.

4. The connection head as in claim 1, in which said rod extends through the casing away from the finger and carries a knob on its free end outside the casing, a piston attached to the rod and slidable inside the sleeve in fluid-tight engagement therewith, means to prevent rotation of the sleeve in the casing, said unidirectionally coacting thrust stops being carried by the rod and by the sleeve and one of the stops comprising an integral inclined peripheral surface and the other comprising an integral radial element contacting said surface and held thereon by force of the spring means in such a manner that when the knob is turned the finger will retract or advance with respect to said annular packing and check valve of the cartridge to control the gas flow from said valve into the connection head.

5. The connection head as in claim 1, in which the rod above the finger has a tapered portion oriented to cooperate with the end of the annular packing where it is fixed to the sleeve to serve as a needle valve, so that, when the check valve of the cartridge is fully open, further advance of the finger into said check valve will insert said tapered portion deeper into said packing to reduce the gas flow.

6. The connection head as in claim 5, in which the end of the annular packing where it is fixed to the sleeve is made of a resilient, elastomeric material and has a non circular bore to cooperate as needle valve seat with the tapered portion of the finger.

7. The connection head as in claim 1, for connection with a cartridge in which the check valve is arranged on the bottom of a depression in the cartridge wall, said improvement comprising said annular packing extending from said sleeve as a resilient annulus depending from said head and disposed to be introduced into said depression to frictionally engage the latter with said check valve so as to ensure primary fluid tightness against the periphery of said depression, this tightness increasing when the annulus is inflated by the pressure of the gas entering the packing as soon as the check valve of the cartridge is opened.

* * * * *